United States Patent
Hannewald

(10) Patent No.: US 7,367,124 B2
(45) Date of Patent: May 6, 2008

(54) METHOD FOR THE PRODUCTION OF A THROTTLE VALVE PORT

(75) Inventor: Thomas Hannewald, Griesheim (DE)

(73) Assignee: Siemens AG, München (DE)

( * ) Notice: Subject to any disclaimer, the term of this patent is extended or adjusted under 35 U.S.C. 154(b) by 350 days.

(21) Appl. No.: 11/014,943

(22) Filed: Dec. 20, 2004

(65) Prior Publication Data

US 2005/0204558 A1 Sep. 22, 2005

Related U.S. Application Data

(63) Continuation of application No. PCT/DE2003/003263, filed on Sep. 30, 2003.

(30) Foreign Application Priority Data

Nov. 22, 2002 (DE) ................................ 102 54 616

(51) Int. Cl.
 *B21D 51/16* (2006.01)
(52) U.S. Cl. .............................. 29/890.12; 29/890.124; 29/890.127; 29/527.5; 251/367; 123/337
(58) Field of Classification Search ............. 29/890.12, 29/890.124, 890.126, 890.127, 527.5; 251/305, 251/367; 123/337
 See application file for complete search history.

(56) References Cited

U.S. PATENT DOCUMENTS 5,188,078 A 2/1993 Tamaki

| | | |
|---|---|---|
| 5,979,871 A | 11/1999 | Forbes et al. |
| 6,427,975 B1 * | 8/2002 | Powell ........................ 251/305 |
| 6,761,348 B2 * | 7/2004 | Michels et al. ............. 251/305 |
| 2002/0104510 A1 | 8/2002 | Kotchi et al. |

FOREIGN PATENT DOCUMENTS

| | | |
|---|---|---|
| DE | 4027269 A1 | 3/1992 |
| DE | GM-9209797.9 | 4/1993 |
| DE | 19825727 A1 | 12/1999 |
| DE | 10114994 A1 | 10/2001 |

(Continued)

OTHER PUBLICATIONS

Derwent Abstract—DE-101 37 771A1; Feb. 20, 2003; Robert Bosch GmbH, D-70469 Stuttgart (Germany).

(Continued)

*Primary Examiner*—Jermie E. Cozart

(57) ABSTRACT

This invention relates of the problem, to create a butterfly valve neck without an emergence of a gap between the butterfly valve neck and the butterfly valve. This invention disposes the problem trough a parted butterfly valve neck, with between attached sealing, where the butterfly valve rest on in the closed location. This invention causes, to reduce considerable the leakage air quantity, by the absent of a gap, between the butterfly valve neck and the butterfly valve in the closed location. An inhibition of the butterfly valve in the parted butterfly valve is no more possible. By the inventive sealing of this invention, the motor can operate with a lower idling speed and a smaller emission. Further, an advantage of this invention is the regulation (adjustment) of the dimension of the parted butterfly valve and the sealing, where-by each of the rule curves by starting will achieved from the closed location.

8 Claims, 2 Drawing Sheets

FOREIGN PATENT DOCUMENTS

| | | |
|---|---|---|
| DE | 10137771 A1 | 2/2003 |
| EP | 0947681 A2 | 10/1999 |
| EP | 0 964 137 A2 | 12/1999 |
| GB | 1 240 746 | 7/1971 |
| GB | 1404921 | 9/1975 |

OTHER PUBLICATIONS

Derwent Abstract—DE-101 14 994A1; Oct. 4, 2001; BorgWarner Inc., US-Troy, Michigan (USA).

Derwent Abstract—DE-GM-92 09 797.9; Apr. 22, 1993; Dipl.-Ing. Klaus Jakobs, D-8000 München (Germany).

Derwent Abstract—DE 40 27 269A1; Mar. 5, 1992; VDO Adolf Schindling AG, D-6000 Frankfurt (Germany).

Derwent Abstract—DE 198 25 727A1; Dec. 16, 1999; Mannesmann VDO AG, D-60388Frankfurt (Germany).

Derwent Abstract—EP 0 964 137 A2; Dec. 15, 1999; Mannesmann VDO Aktiengesellschaft, D-60388 Frankfurt am Main, Germany.

* cited by examiner

METHOD FOR THE PRODUCTION OF A THROTTLE VALVE PORT

CROSS REFERENCE TO RELATED APPLICATIONS

The present application is a continuation of international application PCT/DE2003/003263, filed on Sep. 30, 2003, which designated the United States and was pending at the time of designation and the filing of the present application; and further claims priority to German patent application 10254616.9, filed Nov. 22, 2002; the both of which are herein incorporated by reference.

BACKGROUND OF THE INVENTION

The invention relates to a method for the production of a throttle valve port.

Throttle valve ports are known. They involve generally single-part housings which have an air duct in which a throttle valve is arranged on a throttle valve shaft and the throttle valve shaft is mounted rotatably. The throttle valve port contains gear parts and drive assemblies which are required for actuating the throttle valve. DE 40 27 269 A1 describes a throttle valve port having a throttle valve shaft which can be actuated by an electric motor and mechanically by means of an adjusting lever. The electric motor is a stepping motor arranged on the throttle valve shaft without the interconnection of a coupling. The adjusting lever in this case is connected to the throttle valve shaft by means of a coupling spring. DE 198 25 727 A1 describes a throttle valve port which has a throttle valve which is mounted rotatably in a throttle valve housing and can be adjusted by an actuator via transmission elements. The transmission elements are arranged on or close to an element carrier, the element carrier being fastened to the throttle valve housing. A general disadvantage of the production of throttle valve ports of this type is that the inner parts which are to be integrated in the single-part throttle valve housing, such as, for example, the electric motor, springs, gear wheel segments and throttle valve and throttle valve shaft, have to be introduced into the housing of the throttle valve port on one side in one direction of assembly and then have to be mounted. This manner of manufacturing is relatively complicated, since exact tolerances have to be maintained. A highly automated assembly of throttle valve ports is therefore very complicated and is associated with considerable investment costs.

EP 0 947 681 A2 and US 2002/0104510 A1 disclose methods for the production of a throttle valve port, in which, in a first step, a first housing half and a second housing half are produced with corresponding recesses for inner parts by means of a casting process, then, in a second step, the inner parts are positioned in the first housing half or in the second housing half and then the first housing half and the second housing half are connected to each other in a third step. The first housing half and the second housing half are connected to each other horizontally, and therefore have a connection which runs perpendicularly to the longitudinal direction of the air duct. They are manufactured, for example, by means of metal or plastic, the chosen casting process being, for example, injection molding/diecasting. The inner parts are to be understood as meaning all of those technical components which are arranged in the throttle valve port. These are, for example, the throttle valve, throttle valve shaft, motor, springs, stamped gratings, gear wheel segments, electric components and connectors. These inner parts are positioned in the first housing half or in the second housing half, it being possible for this to take place, for example, by placing or clamping them in. The first housing half can be connected to the second housing half, for example, by screwing or bonding. This enables the inner parts to be fixed at the same time. It has surprisingly been shown that the throttle valve port can thereby be produced relatively rapidly and simply, with a relatively complicated and laborious assembly because of relatively inaccessible openings being dispensed with. The method is very readily suitable for assembly manually or for automatic manufacturing.

EP 0 947 681 A2 describes a throttle valve port having two housing halves of plastic while the throttle valve port according to US 2002/104510 A1 consists completely of metal.

The object of the present invention is to avoid the disadvantages of throttle valve ports manufactured entirely of one material.

According to the invention, in the first step, the first housing half or the second housing half are produced from plastic and the respectively other housing half is produced from aluminum. It is advantageous in this case that the inner parts can be clamped in a relatively simple and easy manner into the housing half of plastic and the respectively other housing half of aluminum can be placed on as a cover. The plastics used are duroplasts or thermoplasts having an appropriate thermal stability.

A preferred refinement of the invention involves, in the second step, the inner parts being positioned only in the first housing half or only in the second housing half. This simplifies automated production, since a housing half which does not have any inner parts can simply be placed onto the complementary housing half as a cover.

According to a further preferred refinement of the invention, at least some of the inner parts are combined to form subunits before the second step. It is thus advantageously possible, for example, to manufacture the motor from individual parts and to firstly produce a motor unit which has dome-type sliding bearings. The use of dome-type sliding bearings can therefore be implemented in a relatively simple and advantageous manner, since the corresponding recesses can easily be arranged beforehand in the casting process during the production of the first housing half and the second housing half.

A further refinement of the invention involves a subunit being a combination of the throttle valve and the throttle valve shaft. In this case, it is advantageous that the connection between the throttle valve and the throttle valve shaft can already be brought about before the positioning in the first housing half or in the second housing half, which is not possible in the known methods because of having to keep to tolerances.

According to a further preferred refinement of the invention, provision is made, in the third step, for a seal to be arranged between the first housing half and the second housing half. The sealing materials used in this case are, for example, plastics which are thermally stable up to approx. 150° C.

According to a further preferred refinement of the invention, in the third step, the second housing half is positioned in the region of the air duct with an encircling collar engaging in the first housing half. The air duct is generally of circular design. The encircling collar is a projection which engages in the first housing half in the third step. As a result, the first housing half and the second housing half can be fixed to each other in a relatively simple, advantageous manner, thus facilitating the arrangement of the inner parts in the throttle valve port.

According to a further preferred refinement of the invention, in the first step, the first housing half is produced with a relatively large first recess and the second housing half is produced with a relatively small second recess by means of a casting process, the first recess and the second recess together forming the air duct, and, in the third step, an insert with an internal taper is arranged between the first housing half and the second housing half, the internal taper of which insert forms the continuous transition from the relatively large first recess to the relatively small second recess. The arrangement of the insert with the internal taper makes it particularly advantageously possible to reduce the cross section of the air duct as required. All that is necessary for this is to appropriately exchange the second housing half and to arrange the insert with the internal taper. In this case, it is particularly advantageous that throttle valve ports which are already present are able to be appropriately retrofitted.

The invention is explained in greater detail and by way of example below with reference to the drawing (FIG. 1 to FIG. 4).

Figure 1:
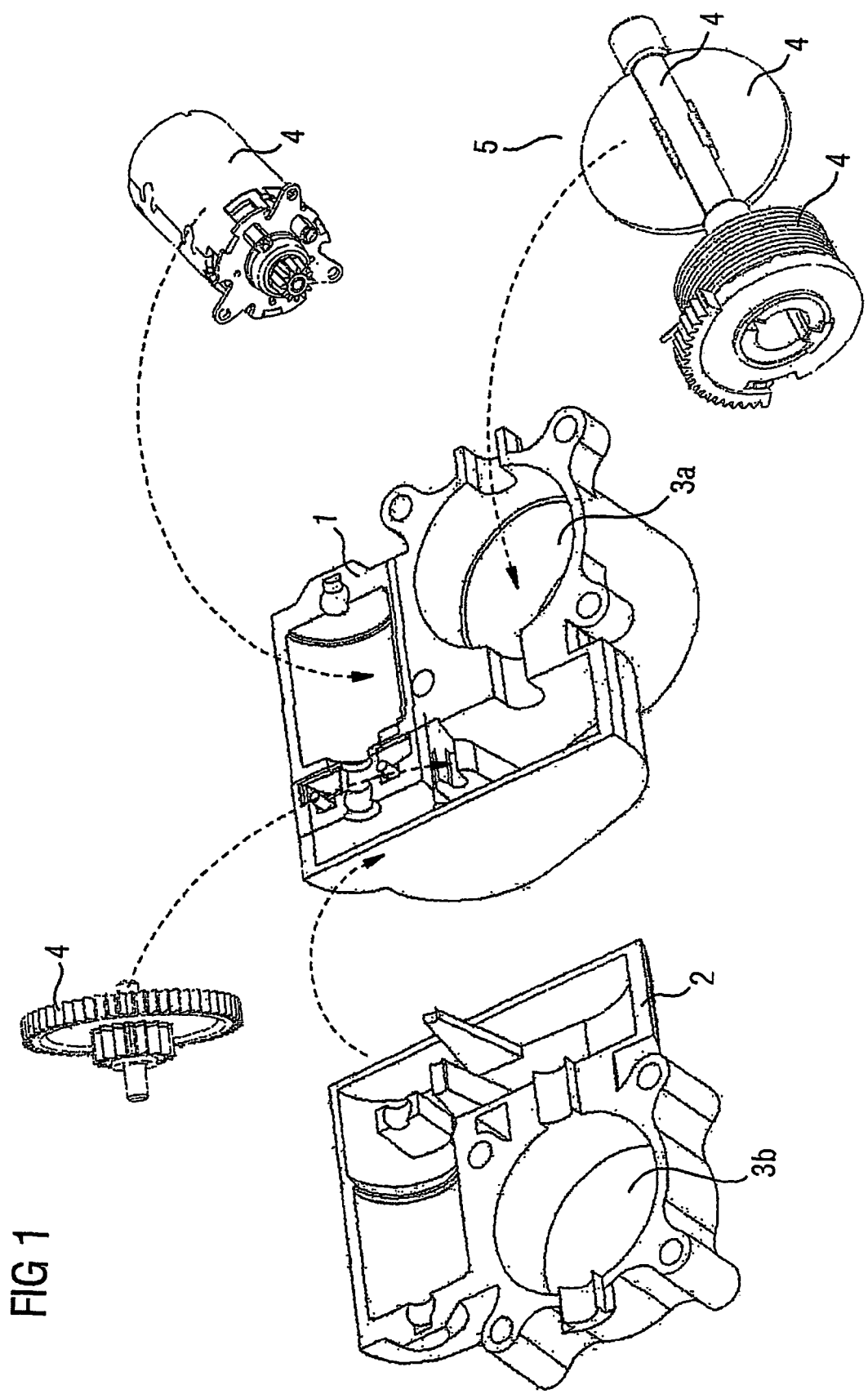
FIG. 1 shows the first housing half and the second housing half of the throttle valve port with inner parts.

FIG. 1 illustrates the first housing half 1 and the second housing half 2 of the throttle valve port. In the method for the production of the throttle valve port, the first housing half 1 and the second housing half 2 are produced with the corresponding recesses for inner parts 4 by means of a casting process, in a first step. In a second step, the inner parts 4 are positioned in the first housing half 1. This takes place in the direction of the arrow. In this case, it is as a rule advantageous to combine at least some of the inner parts 4 to form a subunit 5 before the second step. The first housing half 1 has a first recess 3a and the second housing half 2 has a second recess 3b which form the air duct. In a third step of the method for the production of the throttle valve port, the first housing half 1 and the second housing half 2 are connected to each other. This can take place, for example, by screwing or bonding.

Figure 2:
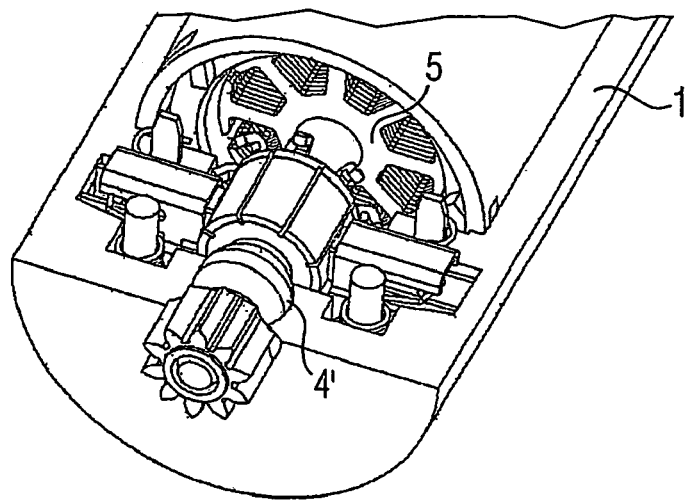
FIG. 2 shows a subunit combined from inner parts.

FIG. 2 is a three-dimensional illustration of a subunit 5 which comprises a plurality of inner parts. It involves the electric motor which is arranged in the first housing half 1. The combining of inner parts to form a subunit 5 in each case permits the advantageous arrangement of dome-type sliding bearings 4' which can be inserted in a relatively simple manner into the recesses of the first housing half 1 or the second housing half (not illustrated).

Figure 3:
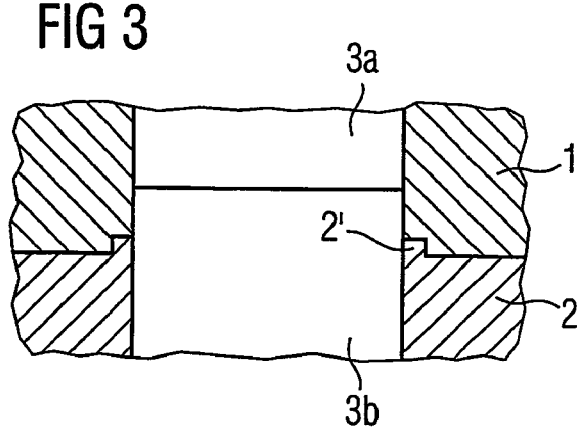
FIG. 3 shows the arrangement of the first housing half and of the second housing half in the region of the air duct, in cross section.

FIG. 3 illustrates the first housing half 1 and the second housing half 2 in the region of the air duct with the first recess 3a and the second recess 3b in cross section. In this case, the second housing half 2 has an encircling collar 2'. In the third step of the method for the production of the throttle valve port, the second housing half 2 is positioned in the region of the air duct with the encircling collar 2' engaging in the first housing half 1. This improves the connection between the first housing half 1 and the second housing half 2 and at the same time improves the fixing of the inner parts (not illustrated).

Figure 4:
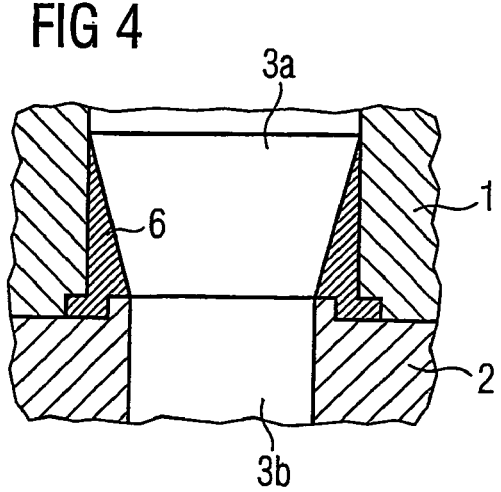
FIG. 4 shows an alternative refinement of the first housing half and of the second housing half in the region of the air duct, in cross section.

FIG. 4 illustrates an alternative arrangement of the first housing half 1 and of the second housing half 2 in the region of the air duct, in cross section. In the first step of the method for the production of the throttle valve port, the first housing half 1 is produced with a relatively large first recess 3a and the second housing half 2 is produced with a relatively small second recess 3b by means of a casting process. The first recess 3a and the second recess 3b together form the air duct. In the third step of the method, an insert 6 with an internal taper is arranged between the first housing half 1 and the second housing half 2, the internal taper of which insert forms the continuous transition from the relatively large first recess 3a to the relatively small second recess 3b. It is advantageous here that the diameter of the air duct may also be retrospectively reduced retrospectively by the arrangement of another, second housing half 2 and the insert 6, which is desirable in some cases.

The invention claimed is:

1. A method for the production of a throttle valve port, comprising the steps of:
   in a first step, a first housing half and a second housing half are produced with corresponding recesses for inner parts by means of a casting process; and
   in a second step, the inner parts are positioned in the first housing half or in the second housing half and then the first housing half and the second housing half are connected to each other in a third step, wherein:
   in the first step, one of the first housing half or the second housing half is produced from plastic and an other of the first housing half and the second housing half is produced from aluminum; and
   in the third step, the second housing half is positioned proximate to an air duct with an encircling collar engaging in the first housing half.

2. A method for the production of a throttle valve port, comprising the steps of:
   in a first step, a first housing half and a second housing half are produced with corresponding recesses for inner parts by means of a casting process; and
   in a second step, the inner parts are positioned in the first housing half or in the second housing half and then the first housing half and the second housing half are connected to each other in a third step, wherein:
   in the first step, one of the first housing half or the second housing half is produced from plastic and an other of the first housing half and the second housing half is produced from aluminum;
   in the first step, the first housing half is produced with a large first recess and the second housing half is produced with a small second recess by means of a casting process, the first recess and the second recess together forming an air duct; and
   in the third step, an insert with an internal taper is arranged between the first housing halt and the second housing half, the internal taper of which insert forms a continuous transition from the large first recess to the small second recess.

3. A method for the production of a throttle valve port, comprising the steps of:
   in a first step, a first housing half and a second housing half are produced with corresponding recesses for inner parts by means of a casting process; and
   in a second step, the inner parts are positioned in the first housing half or in the second housing half and then the first housing half and the second housing half are connected to each other in a third step, wherein:
   in the first step, one of the first housing half or the second housing half is produced from plastic and an other of the first housing half and the second housing half is produced from aluminum;

at least some of the inner parts are combined to form subunits before the second step:

one subunit is a combination of a throttle valve and a throttle valve shaft; and in the third step, the second housing half is positioned proximate to an air duct with an encircling collar engaging in the first housing half.

4. A method for the production of a throttle valve port, comprising the steps of:

in a first step, a first housing half and a second housing half are produced with corresponding recesses for inner parts by means of a casting process; and in a second step, the inner parts are positioned in the first housing half or in the second housing half and then the first housing half and the second housing half are connected to each other in a third step, wherein:

in the first step, one of the first housing half or the second housing half is produced from plastic and the other housing half is produced from aluminum;

in the third step, a seal is arranged between the first housing half and the second housing half; and in the third step, the second housing half is positioned proximate to an air duct with an encircling collar engaging in the first housing half.

5. The method according to claim 4, wherein, in the first step, the first housing half is produced with a large first recess and the second housing half is produced with a small second recess by means of a casting process, the first recess and the second recess together forming an air duct, and in which, in the third step, an insert with an internal taper is arranged between the first housing half and the second housing half, the internal taper of which insert forms a continuous transition from the large first recess to the small second recess.

6. A method for the production of a throttle valve port, comprising the steps of:

in a first step, a first housing half and a second housing half are produced with corresponding recesses for inner parts by means of a casting process; and in a second step, the inner parts are positioned in only one of the first housing half or in the second housing half and then the first housing half and the second housing half are connected to each other in a third step, wherein:

in the first step, one of the first housing half or the second housing half is produced from plastic and an other of the first housing half and the second housing half is produced from aluminum;

at least some of the inner parts are combined to form subunits before the second step;

one subunit is a combination of a throttle valve and a throttle valve shaft; and in the third step, the second housing half is positioned proximate to an air duct with an encircling collar engaging in the first housing half.

7. A method for the production of a throttle valve port, comprising the steps of:

in a first step, a first housing half and a second housing half are produced with corresponding recesses for inner parts by means of a casting process; and in a second step, the inner parts are positioned in only one of the first housing half or in the second housing half and then the first housing half and the second housing half are connected to each other in a third step, wherein:

in the first step, one of the first housing half or the second housing half is produced from plastic and an other of the first housing half and the second housing half is produced from aluminum;

at least some of the inner parts are combined to form subunits before the second step;

one subunit is a combination of a throttle valve and a throttle valve shaft;

in the third step, a seal is arranged between the first housing half and the second housing half, and in the third step, the second housing half is positioned proximate to an air duct with an encircling collar engaging in the first housing half.

8. The method according to claim 7, wherein, in the first step, the first housing half is produced with a large first recess and the second housing half is produced with a small second recess by means of a casting process, the first recess and the second recess together forming an air duct, and in which, in the third step, an insert with an internal taper is arranged between the first housing half and the second housing half, the internal taper of which insert forms a continuous transition from the large first recess to the small second recess.

* * * * *